Figure 1:
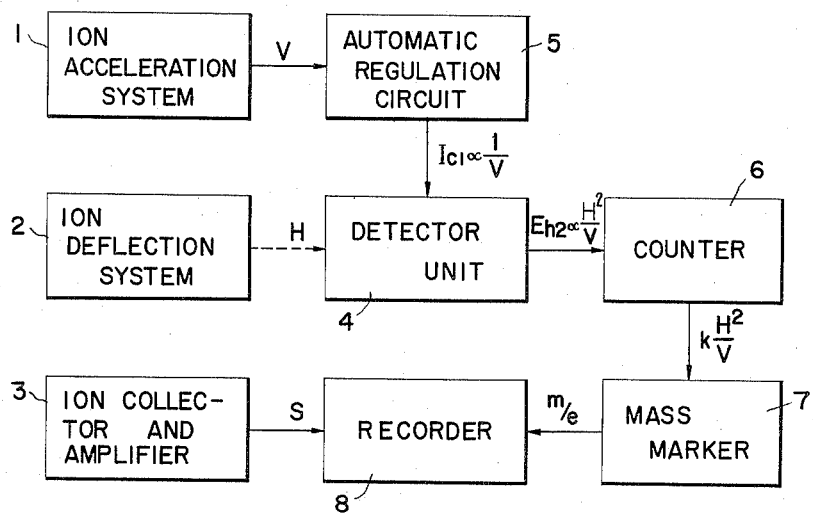

United States Patent Office 3,244,876
Patented Apr. 5, 1966

3,244,876
MASS SPECTROMETRIC APPARATUS HAVING A DETECTOR COMPRISING TWO HALL EFFECT DEVICES CONNECTED IN TANDEM
Yozo Kanda, Kodaira-shi, Shoji Tauchi, Kitatama-gun, Tokyo-to, and Nozomu Morito, Suginami-ku, Japan, assignors to Kabushiki Kaisha Hitachi Seisakusho, Tokyo-to, Japan, a joint-stock company of Japan
Filed Aug. 23, 1963, Ser. No. 304,041
Claims priority, application Japan, Aug. 25, 1962, 37/36,555
6 Claims. (Cl. 250—41.9)

The present invention relates to mass spectrometry and like techniques and more particularly to improvements in mass spectrometric apparatuses and like apparatuses.

More specifically, the invention relates to means to detect, in a simple manner through the use of two Hall effect devices, a voltage which is directly proportional to mass number and relates to improvements of the mass marker of the resulting spectrum.

In general, the ratio $m/e$ (hereinafter referred to merely as $m/e$) of the mass $m$ and charge $e$ possessed by ions entering an ion collector of a mass spectrometer may be expressed by the following equation:

$$m/e = k(H^2/V) \qquad (1)$$

where $H$ is the magnetic field strength, $V$ is the ion acceleration voltage, and $k$ is a constant.

Accordingly, at any instant of time, the $m/e$ value of the ions entering the ion collector is in inverse proportion to the ion acceleration voltage at the time and, moreover, is proportional to the square of the magnetic field strength. Therefore, one possibility of measuring the magnetic field indirectly is that of measuring its exciting current, and such a method has heretofore been resorted to.

Such a method, however, is subject to disadvantages such as measurement errors due to the phenomenon of residual electromagnetic hysteresis. Furthermore, since the exciting current is proportional to the square root of the $m/e$ value, the scale of mass number of mass spectrum obtained is not evenly spaced when mass analysis of an unknown sample is being carried out, the said scale becoming foreshortened as the mass number increases. Consequently, in order to examine mass spectrums so obtained, complicated methods requiring considerable experience, such as comparison with a known mass spectrum, have heretofore been resorted to.

It is an object of the present invention to overcome the aforementioned difficulties and to provide a new and original mass spectrometric apparatus capable of directly detecting, in a simple manner, the aforementioned ion acceleration voltage and magnetic field and, in response to the values so detected, indicating the $m/e$ value at any point of the mass spectrum obtained.

It is another object to provide an apparatus as stated above which is economical, being of relatively simple construction and simple operation requiring no special skill or experience.

It is still another object to provide an apparatus as stated above which can be operated rapidly yet with a high degree of accuracy.

It is a further object to provide an apparatus as stated above which is applicable to a wide range of uses, and which has numerous convenient features and other advantages as will become apparent hereinafter.

The foregoing objects, as well as other objects and advantages, have been achieved by the present invention, which, briefly described, provides a mass spectrometric apparatus in which first and second Hall effect devices are provided in a magnetic field H for accelerated ions, the first Hall effect device being provided with means for passing therethrough a control current which is inversely proportional to the ion acceleration voltage $V$, and the output terminals of the first Hall effect device being connected directly or indirectly to the input terminals of the second Hall effect device, and which is adapted to produce between the output terminals of the second Hall effect device response to the quantity $H^2/V$.

In an application of the invention, the above-mentioned output voltage and the output of the ion collector are respectively introduced as inputs of coordinate axes of a recorder, whereby a mass spectrum according to an evenly-spaced mass-number scale is graphically recorded.

In a further application for the case wherein scanning has been carried out with preset ion acceleration voltage and/or the magnetic field H, the mass number scale is caused to be graphically recorded beforehand in response to the aforementioned output voltage of the second Hall effect device, and then the aforementioned ion collector output obtained from the scanning with presetting is recorded on the recording.

Figure 2:
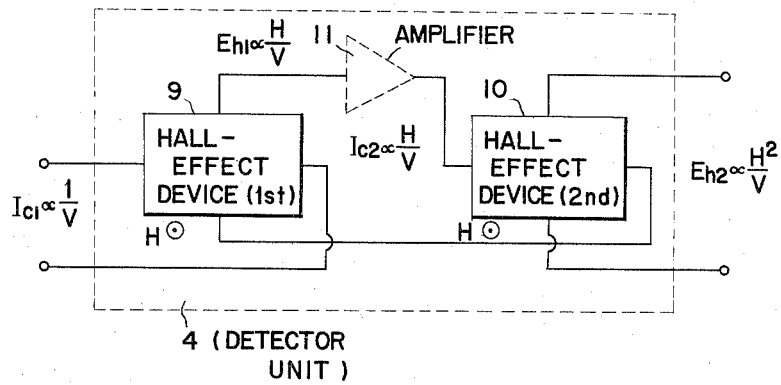

The nature, principle, and details of the invention will be more clearly apparent by reference to the following description taken in connection with the accompanying drawing in which:

FIGURE 1 is a block diagram indicating a preferred embodiment of the mass spectrometric apparatus according to the invention; and FIGURE 2 is a schematic connection diagram indicating one example of a detector unit suitable for use in the apparatus illustrated in FIGURE 1.

The mass spectrometric apparatus of the invention, as illustrated by the preferred embodiment shown in FIGURE 1, has an analyzer unit which comprises an ion acceleration system 1 for providing an ion acceleration voltage V, an ion deflection system 2 imparting a magnetic field H, and an ion collector and amplifier 3. A detector unit 4 having two Hall effect devices 9 and 10 is disposed in the gap of the magnetic pole pieces establishing the magnetic field H. A control current supplied to the Hall effect device 9 of the detector unit 4 is regulated by an automatic regulation circuit 5. The output side of the detector unit 4 is connected to one of the axes (for example, X) of an X-Y coordinate axes recorder 8 by way of a counter 6 and a mass marker 7 for indicating $m/e$ value. The other axis (Y) of the recorder is connected to the output side of the ion collector and amplifier 3.

The detector unit 4 provided in the gap between the magnetic poles has an arrangement wherein the output terminals of the first Hall effect device 9 are connected to the input terminals of the second Hall effect device 10, for example, as shown in FIGURE 2. Depending on the necessity, an amplifier 11 is connected between one output terminal of the first Hall effect device 9 and the corresponding input terminal of the second Hall effect device 10.

The automatic regulation circuit 5 is adapted to supply to the input side of the first Hall effect device 9 a control current $I_{c1}$ of a value which is inversely proportional to the value of the aforementioned ion acceleration voltage $V$. Accordingly, the output voltage $E_{h1}$ of the first Hall effect device 9 has the following relationships.

$$E_{h1} \infty I_{c1}.H \infty H/V \qquad (2)$$

Because of the aforedescribed arrangement of the detector unit 4, this output voltage $E_{h1}$ of the first Hall effect device 9 is applied directly, or through an amplifier 11 if necessary, to the input terminals of the second Hall-effect device 10 to cause a control current $I_{c2}$ proportional to the voltage $E_{h1}$ to flow therethrough, whereby the output voltage $E_{h2}$ of the second Hall effect device 10 has the following relationships.

$$E_{h2} \infty I_{c2}.H \infty E_{h1}.H \infty H^2/V \qquad (3)$$

Thus, this output voltage $E_{h_2}$ is of a value directly proportional to the value $H^2/V$, that is, to the value $m/e$.

This output voltage or signal is led through the counter 6, or amplified by means of a suitable amplifier, and then introduced into the mass marker 7 where it causes the value of $m/e$ satisfying the aforestated Equation 1 at any instant of time to be indicated. The signal causing indication of the $m/e$ value is then led to the X axis of the X-Y coordinate axes recorder 8, while, on one hand, the ion collector and amplifier 3 is recorded as the input for the Y axis. Thus, a mass spectrum of evenly-spaced mass number scale is created.

It is to be observed that the essential feature of the present invention resides in an apparatus wherein two Hall effect devices are placed in a magnetic field H, the output terminals of the first Hall effect device and the input terminals of the second Hall-effect device being connected directly or indirectly, whereby a signal proportional to the value $H^2/V$ is readily obtained, and it is possible to detect or measure the $m/e$ value at any point of a mass spectrum. In addition to the method of spectral recording of the above-described embodiment, numerous other convenient variations are possible.

For example, in the mass marker 7, arrangements are possible whereby pulse signals are generated at intervals of any even spacing of the signal indicating the $m/e$ value which satisfies the aforestated Equation 1 and introduced into one element of a recorder of multiple elements, and the mass marker ($m/e$) is registered on the transverse axis of the mass spectrum recorded by a separate element. In another possible arrangement, the signal indicating the $m/e$ value is introduced directly, without change, into one element of a recorder of multiple elements and caused to record a curve of the $m/e$ value simultaneously with the mass spectrum recorded by a separate element. In still another arrangement, the mass marker ($m/e$) is registered on the recording medium in response to a signal indicating the $m/e$ value in accordance with a preset scanning method, and then the mass spectrum is registered on this recording medium.

By the use of the mass spectrometric apparatus of the above-described arrangement according to the present invention, the $m/e$ value at any point of a mass spectrum obtained can be automatically detected and recorded. Accordingly, analyses of samples can be carried out rapidly yet with high accuracy, whereby study of analysis results is greatly facilitated and simplified and does not include any element of experience.

Therefore, the present invention is highly advantageous in that it enables even operators without special skill to make accurate evaluations. This advantage, together with the relatively simple and convenient arrangement and operation of the apparatus, affords substantial economy.

The present invention, in its broader aspect, is not limited to only apparatuses for mass spectrometry but is applicable to other apparatuses such as, for example, charged particle energy analyzers and isotope separators, wherein utilization of the principle of the present invention can be effectively made.

It should be understood, of course, that the foregoing disclosure relates principally to only a preferred embodiment of the invention and that it is intended to cover all charges and modifications of the example of the invention herein chosen for the purposes of the disclosure, which do not constitute departures from the spirit and scope of the invention as set forth in the appended claims.

What is claimed is:

1. In a mass spectrometric or like apparatus having a magnetic field of strength H for dispersing ions accelerated by an ion acceleration voltage V, means to detect a voltage which is directly proportional to mass number, said means comprising first and second Hall effect devices both disposed within the said magnetic field, the output terminals of the said first Hall effect device being connected to the input terminals of the said second Hall effect device, and means to supply to the said first Hall effect device a control current which is inversely proportional to the said ion acceleration voltage V, whereby an output voltage corresponding to the value $H^2/V$ is produced between the output terminals of the said second Hall-effect device.

2. In a mass spectrometric or like apparatus having a magnetic field of strength H for dispersing ions accelerated by an ion acceleration voltage V and having an ion collector, means to register on a recording medium a mass spectrum based on an equally-spaced mass number scale, said means comprising: first and second Hall effect devices both disposed within the said magnetic field, the output terminals of the said first Hall effect device being connected to the input terminals of the said second Hall effect device; means to supply to the said first Hall effect device a control current which is inversely proportional to the said ion acceleration voltage V, whereby an output voltage corresponding to the value $H^2/V$ is produced between the output terminals of the said second Hall-effect device; and an X-Y coordinate axes recorder, the said output voltage being introduced as the input of one of the coordinate axes of the said recorder, and the output of the said ion collector being introduced as the input of the other of the said coordinate axes.

3. In a mass spectrometric or like apparatus having a magnetic field of strength H for dispersing ions accelerated by an ion acceleration voltage V and having an ion collector, the combination comprising: first and second Hall-effect devices both disposed within the said magnetic field, the output terminals of the said first Hall effect device being connected to the input terminals of the said second Hall effect device; means to supply to the said first Hall effect device a control current which is inversely proportional to the said ion acceleration voltage $V$, whereby an output voltage corresponding to the value $H^2/V$ is produced between the output terminals of the said second Hall effect device; and a recording means having a recording medium and means adapted to register beforehand on the said recording medium a mass number scale in accordance with the said output voltage of the said second Hall effect device in the case when scanning is accomplished with the said ion acceleration voltage and/or magnet field strength in a preset state and subsequently to record on the said recording medium the output of the said ion collector obtained by the said present scanning.

4. An apparatus as defined in claim 1, wherein at least one of the said output terminals of the said first Hall-effect device is connected indirectly to the said input terminal corresponding thereto of the said second Hall effect device through an amplifier.

5. An apparatus as defined in claim 2, wherein at least one of the said output terminals of the said first Hall effect device is connected indirectly to the said input terminal corresponding thereto of the said second Hall effect device through an amplifier.

6. An apparatus as defined in claim 3, wherein at least one of the said output terminals of the said first Hall effect device is connected indirectly to the said input terminal corresponding thereto of the said second Hall effect device through an amplifier.

No references cited.

RALPH G. NILSON, *Primary Examiner.*

A. L. BIRCH, *Assistant Examiner.*